United States Patent [19]

Dunphy et al.

[11] Patent Number: 5,426,297
[45] Date of Patent: Jun. 20, 1995

[54] MULTIPLEXED BRAGG GRATING SENSORS

[75] Inventors: James R. Dunphy, Glastonbury; Kenneth P. Falkowich, Coventry, both of Conn.

[73] Assignee: United Technologies Corporation, Hartford, Conn.

[21] Appl. No.: 127,389

[22] Filed: Sep. 27, 1993

[51] Int. Cl.⁶ ............... G01K 3/00; G01K 11/00; G01J 3/50

[52] U.S. Cl. ............... 250/227.23; 250/226; 250/231.11; 250/237 R; 250/256

[58] Field of Search ............ 250/226, 227.23, 231, 250/237, 256

[56] References Cited

U.S. PATENT DOCUMENTS

| | | | |
|---|---|---|---|
| 4,761,073 | 8/1988 | Meltz et al. | 356/32 |
| 4,806,012 | 2/1989 | Meltz et al. | 356/32 |
| 4,999,489 | 3/1991 | Haggins | 250/227.23 |
| 5,299,869 | 4/1994 | Wissinger | 250/227.23 |

FOREIGN PATENT DOCUMENTS

RM93A0597 9/1993 Italy .

OTHER PUBLICATIONS

A paper entitled, "Strain Sensing Using a Fiber Optic Bragg Grating" by Serge M. Melle, Kexing Liu, and Raymond M. Measures, Institute for Aerospace Studies, University of Toronto, Downsview, Ontario, M3H 5T6, Canada.

Primary Examiner—William L. Sikes
Assistant Examiner—Fetsum Abraham
Attorney, Agent, or Firm—Gerald L. DePardo

[57] ABSTRACT

A measurement system for fiber sensors includes a broadband light source 11 providing continuous light which is launched into a fiber 20 having a plurality (or string) of Bragg grating sensors 24, 28, 34. Each sensor has a predetermined central reflection wavelength which shifts as a function of applied strain. Reflected light 40 from the sensors 24, 28, 34 are fed to a plurality of optical bandpass filters 50, 64, 78, each having a monotonic region in a passband corresponding to one of the sensors. Each monotonic region transmits the reflected wavelength from a corresponding sensor. Light 52, 66, 80 is passed from the filters 50, 64, 78 to optical detectors 54, 68, 82 each providing an electrical signal having a magnitude related to transmission of the filter at the reflection wavelength of the sensor. Optional demodulators 58, 72, 86 are connected to each of the detectors 54, 68, 82 if the light source 10 is modulated. Such modulation provides noise immunity and allows demultiplexing of several strings of sensors.

9 Claims, 5 Drawing Sheets

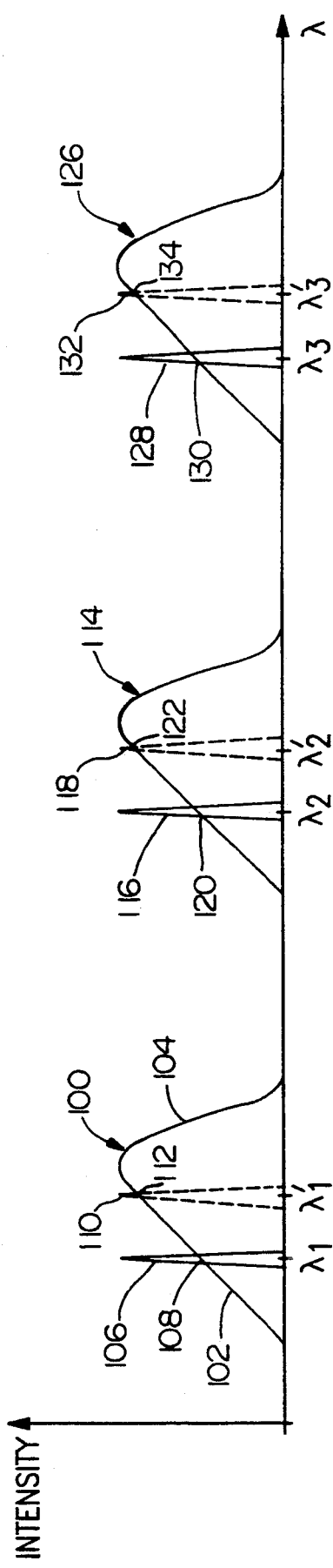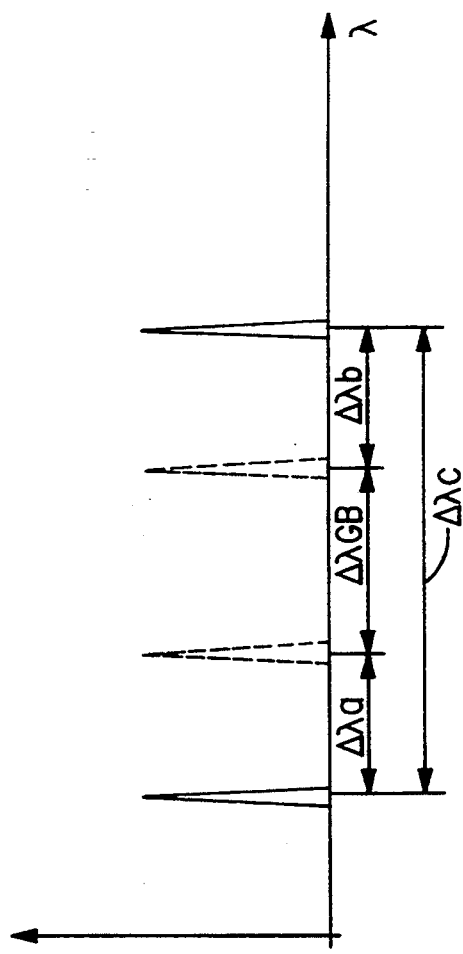

MULTIPLEXED BRAGG GRATING SENSORS

The United States Government has a paid-up license in this invention and the right in limited circumstances to require the patent owner to license others on reasonable terms as provided for by the terms of contract No. MDA 972-90-C-0026 awarded by ARPA.

TECHNICAL FIELD

This invention relates to optical fiber sensors and, more particularly, to multiplexing fiber sensors having Bragg gratings.

BACKGROUND ART

It is known that Bragg gratings impressed in optical fibers may be used to detect perturbations, such as strain or temperature, at the location of the gratings, as is described in U.S. Pat. Nos. 4,806,012 and 4,761,073, both to Meltz et al. In such a sensor, the core of the optical fiber is written with periodic grating patterns (i.e., a periodic variation in refractive index) effective for reflecting a narrow wavelength band of light launched into the core. Spectral shifts in the transmitted and reflected light indicate the intensity of strain or temperature variations at positions of the grating corresponding to the associated wavelengths of the injected light. When such a sensor is embedded in or disposed on a structure for measuring strains and loads on the structure, the structure is called a "smart structure system".

However, such Bragg grating sensors require a spectrometer to determine the sensor response, to determine the wavelength shift for each of the gratings, and to multiplex from one grating to the next. Furthermore, such a spectrometer-based system is costly, delicate, bulky, and has a slow response time.

One technique known in the art for eliminating the need for a spectrometer is described in a paper by S. Melle, "Strain Sensing Using A Fibre Optic Bragg Grating", Institute for Aerospace Studies, University of Toronto, Downsview, Ontario, M3H 5T6, Canada. Such a technique uses a wavelength dependent optical filter having a frequency response which has a linear region above which all wavelengths are passed (or transmitted) through the filter. The reflective peak of the Bragg grating is designed to be located within the linear attenuation region of the filter. Thus, as the central wavelength of the reflectivity profile (or spectrum) of the Bragg grating shifts according to strain, temperature or other perturbation, the output intensity of the filter will change accordingly. However, because the filter passes all wavelengths above the linear region, only a single Bragg grating sensor may be used with each optical filter.

Thus, it would be desirable to provide a system which completely replaces a spectrometer and allows a plurality of Bragg grating sensors on a single fiber as well as a plurality of fibers, each having a plurality of Bragg gratings to be detected, and which senses each of the wavelengths (and shifts thereof) reflected by the Bragg grating.

DISCLOSURE OF INVENTION

Objects of the invention include provision of a fiber optic Bragg grating sensing system which provides sensing of a plurality of Bragg grating sensors on a single fiber as well as a plurality of fiber sensor strings which are sensed without the use of a spectrometer.

According to the present invention, a measurement system for optical sensors includes light source means which provides a continuous broadband light which is launched into an optical waveguide, such as an optical fiber; a sensor string having a plurality of sensors disposed in the path of the broadband light, each sensor providing a reflected light having an associated peak reflection wavelength; the reflection wavelength is related to the magnitude of a perturbation on a corresponding one of said sensors; collimating means which collimates the reflected light from the sensors and provides a collimated light; a plurality of optical filters, each corresponding to one of the sensors, is disposed in the path of a portion of said collimated light, each of which has a passband with a monotonic region overlapping the reflection wavelength of the corresponding one of the sensors, each of the filters provides passed light transmitted through the filter, and the passed light has a power related to the optical transmission of the optical filter at the sensor reflection wavelength; and a plurality of optical detection means, each disposed in the path of said passed light of a corresponding one of said optical filters, each detecting the power of the passed light, and each providing an electrical output signal indicative of the power of the passed light; the magnitude of the output signal is indicative of the magnitude of the perturbation on the corresponding one of the sensors.

According further to the invention, modulating means are provided to modulate the broadband source light at a predetermined modulation frequency and to provide a continuous modulated source light to be launched into the optical fiber, and demodulating means are provided to demodulate the passed light at a frequency equal to the modulation frequency.

According still further to the invention, a plurality of modulators, a plurality of sensor strings, each of the sensor strings having at least one sensor having a common reflectivity wavelength range, and a plurality of demodulators are provided; each of the demodulators are responsive to one of the detectors, running at the frequency of one of the modulators, and each of the demodulators is associated with a corresponding sensor which is modulated at the frequency of one of the modulators, the number of demodulators associated with any detector being equal to the number of sensor strings having the common reflectivity wavelength range, and the number of filters corresponding to the number of sensors on one of the sensor strings having the most sensors.

In still further accord to the invention, the sensors are Bragg gratings embedded in the optical fiber.

The invention represents a significant improvement over the prior art by eliminating the use of costly, delicate, bulky, and slow spectrometers and replacing them with a combination of an optical filtering and electronic demodulation to provide a low cost, high speed sensor decoding technique. The sensors may be disposed on structures made of metal, plastic, composite, or any other material that expands, contracts, or vibrates, or the sensors may be embedded within such structures. The invention provides an output signal indicative of the reflectivity wavelength and thus the perturbation sensed at a given sensor.

Also, the invention allows a plurality (or string) of sensors on an optical fiber to be wavelength demultiplexed and also allows detection of several strings of sensors which are frequency modulated. Furthermore, the invention uses inexpensive optical transmitters to stimulate the system.

Moreover, the invention illuminates all the sensors simultaneously, thereby providing continuous output signals relating to all the sensors at all times. Such totally parallel operation avoids time delays between the measurements of each sensor typically associated with sampling (or scanning) systems, where only one sensor is analyzed at a given time.

The foregoing and other objects, features and advantages of the present invention will become more apparent in light of the following detailed description of exemplary embodiments thereof as illustrated in the accompanying drawings.

BRIEF DESCRIPTION OF DRAWINGS

FIG. 2 is a graph showing the reflectivity profile of three Bragg grating sensors superimposed on the wavelength response of an optical band pass filter in accordance with the present invention.

FIG. 3 is a graph of the reflectivity profile of two adjacent Bragg grating sensors showing the guardband spacing between them in accordance with the present invention.

BEST MODE FOR CARRYING OUT THE INVENTION

Figure 1:
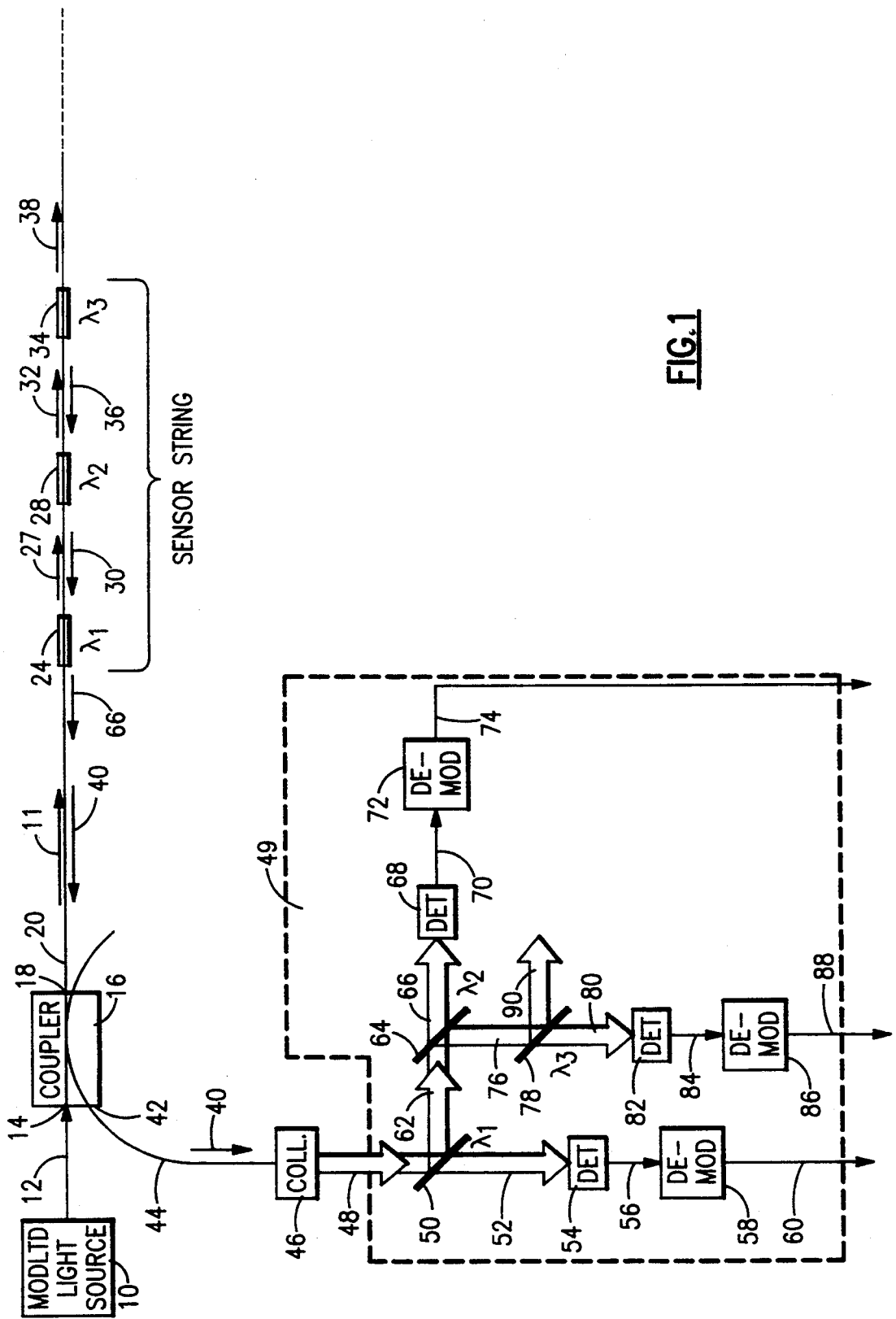
FIG. 1 is a schematic block diagram of a measurement system for a plurality of Bragg grating sensors on a single optical fiber string which is wavelength filtered and frequency demodulated in accordance with the present invention.

Referring to FIG. 1, a modulated light source 10, e.g., a superluminescent diode driven by an AC signal, provides an amplitude modulated broadband light source signal 11 onto a fiber 12. The modulated source signal 11 is sinusoidally modulated from OFF to FULL-ON intensity at a predetermined modulation frequency, e.g., 1 kHz. Other modulation frequencies and intensity ranges may be used if desired. The modulated light source signal 11 travels along the optical fiber 12 to a first port 14 of an optical coupler 16 and then exits the coupler 16 from a port 18 and propagates along a fiber 20.

The broadband light source signal 11 is incident on a Bragg grating 24 having a central reflectivity wavelength $\lambda_1$. A Bragg grating, as is known, is a periodic refractive index variation in the core of an optical fiber that reflects a narrow wavelength band of light, has a maximum reflectivity at a central reflectivity wavelength, and transmits all other wavelengths. Thus, when the broadband light source signal 11 is incident on the Bragg grating 24, a narrow wavelength band of light 26 having a central wavelength $\lambda_1$ is reflected therefrom and light not reflected is transmitted through the grating 24 as indicated by a line 27.

The light 27 is incident on a Bragg grating 28 in the fiber 20 having a central reflectivity wavelength $\lambda_2$. A narrow wavelength band of light 30 having a central wavelength $\lambda_2$ is reflected from the grating 28. Light 32 not reflected as the optical signals 26, 30 is transmitted to a grating 34 having a central reflectivity wavelength $\lambda_3$. The grating 34 reflects a narrow wavelength band of light 36 having a central wavelength $\lambda_3$ and transmits the remaining wavelengths of light not included in the reflected signals 26, 30, 36, as indicated by a line 38. The optical signal 38 may then be incident on more fiber gratings (not shown), each producing its own reflected signal. Any number of gratings along a given fiber may be used to make up a sensor string.

Each of the reflected signals 26, 30, 36 travels along the fiber 20 back to the coupler 16 and is collectively indicated by a line 40 which reenters the coupler 16 at the port 18. The light 40 exits the coupler 16 from a port 42 and propagates along a fiber 44 to an optical collimator 46 which converts the light 40 in the fiber 44 into a collimated beam 48 which exits the collimator 46.

The collimated beam 48 is incident upon an optical-to-electronic demultiplexer 49 which continuously wavelength filters and frequency demodulates the optical input signal to provide a plurality of continuous electrical output signals, each having a magnitude indicative of the wavelength of a corresponding one of the sensors 24, 28, 34. In particular, the collimated beam 48 is incident upon an optical bandpass filter 50, e.g., a single cavity interference filter Part No. 1325-SC-3 by Omega Optical of Brattleboro VT, which comprises a glass disk having a predetermined coating that provides the desired filter response. Other optical bandpass filters may be used if desired. The optical wavelength response of the filter 50 is such that it passes (or transmits) light over a predetermined wavelength range (or passband), has a substantially monotonic and linear slope at certain portions, and reflects all other wavelengths (discussed hereinafter). In particular, the optical filter 50 has a passband including the wavelength $\lambda_1$ associated with the Bragg grating sensor 24.

The optical filter 50 passes a collimated light beam 52 having a central wavelength $\zeta_1$ which is incident on an optical detector 54. The optical detector 54 provides an electrical signal on a line 56 indicative of the optical intensity of the light incident thereon. The electrical signal on the line 56 is fed to an electronic demodulator 58, e.g., an asynchronous demodulator, operating at the modulation frequency of the modulated light source 10. However, the demodulator need not be asynchronous. The demodulator 58 demodulates the modulated signal and produces a demodulated electrical output signal on a line 60 having a voltage which varies with the shift in the reflectivity profile (and the corresponding shift in reflection wavelength) of the Bragg grating sensor 24 due to the strain imposed on the sensor 24. This shift occurs, in large part, due to a change in the spatial periodicity of the refractive index variations of the Bragg gratings, as is known.

A beam 62 is reflected off the optical filter 50, and has all the wavelengths of the light beam 48 that were not passed by the filter 50. The light 62 is incident on a second filter 64 similar to the filter 50 except having a passband including the wavelength $\lambda_2$ associated with the Bragg grating sensor 28. The filter 64 passes a light beam 66 to an optical detector 68 which provides an electrical signal on a line 70 indicative of the optical power of the optical signal 66 incident thereon. The electrical signal on the line 70 is fed to an electronic demodulator 72 similar to the demodulator 58. The demodulator 72 provides a demodulated electrical signal on a line 74 having a voltage which varies with the shift in reflectivity profile (and the corresponding shift in reflection wavelength) of the Bragg grating sensor 28 due to strain imposed on the sensor 28.

A light beam 76 is reflected off the optical filter 64, and has all wavelengths of the light beam 48 other than those of the beams 52,66, and is incident on a filter 78 similar to the filters 50,64. The filter 78 has a passband including a wavelength $\lambda_3$ associated with the filter 34. The light 80 is passed through the filter 78 to a detector 82 similar to that of detectors 54, 68. The detector 82 provides an electrical signal on a line 84 indicative of the power of the optical signal 80 incident thereon. The electrical signal on the line 84 is fed to a demodulator 86 similar to that of the demodulators 58, 72. The demodulator 86 provides a demodulated electrical signal on a line 88 having a voltage which varies with the shift in reflectivity profile (and the corresponding shift in reflection wavelength) of the Bragg grating sensor 34 due to the strain imposed on the sensor 34.

A residual light beam 90 is reflected off the filter 78 into free space and is not used. However, if there were more sensors in the sensor string, more optical filters would be placed in the path of the beam 78 to tap off the particular wavelengths associated with those sensors.

Referring now to FIG. 2, a passband gain (or magnitude) profile 100 of the filter 50 (FIG. 1) has a substantially monotonic and linear region 102 having a positive slope and a negative sloped region 104. For the sake of illustration, the filter may be viewed as having a gain of 1 (i.e., unity magnitude; no attenuation) at the maximum peak of the filter passband profile. Also, the grating sensor 24 (FIG. 1) has a reflectivity profile 106 centered at the wavelength $\lambda_1$ which overlaps the linear region of the filter passband. The reflectivity profile 106 also indicates the wavelength spectrum of reflected light 26 (FIG. 1) which is a part of the collimated light 48 incident on filter 50.

The filter passes (or transmits), at varying levels of attenuation, only light having wavelengths within the passband profile 100. Thus, the output light 52 from the filter 50, will have a power indicative of the power of the input light 48 at the wavelength $\lambda_1$ of the light reflected from the sensor 24, reduced by the amount of attenuation indicated by a point 108 of the filter 50 at that same wavelength $\lambda_1$ (i.e., the output power is related to the optical transmission of said optical filter at the sensor reflection wavelength). It should be understood that the filter profile (or response, or passband) shown is a magnitude transmission function that shows the amount of attenuation applied to the input signal.

As discussed hereinbefore, when a strain or other perturbation is applied to the filter 24, the spatial periodicity of the refractive index variation changes (along with the average index of refraction), thereby shifting the central (or peak) wavelength of the Bragg grating reflectivity profile. For example, when a given strain is applied to the sensor 24, the profile 106 shifts to a different location as indicated by a sensor profile 110 having a central wavelength $\lambda_1'$. The intersection between the sensor reflectivity profile 110 and the filter passband profile 100 is indicated by a point 112 which corresponds to the filter transmission at that wavelength and, thus, the relative output power of the light 52 under this perturbed condition.

A similar filter profile exists for the optical filter 64 having a passband profile 114. Similarly, the sensor 28 has a reflectivity profile 116 which is centered at the wavelength $\lambda_2$. Upon introducing a perturbation, the central wavelength shifts, for example, to a profile 118 centered at a wavelength $\lambda_2'$. Accordingly, the filter attenuation changes (decreases) from a point 120 to a point 122 and thereby causing the output power to increase proportionately.

A similar relationship exists for the optical filter 78 having a filter profile 126 and the sensor 34 having a corresponding reflectivity profile 128. The filter attenuation is indicated by a point 130. If there is a change in sensor reflectivity profile to a profile 132, there is a corresponding increase in output power indicated by a point 134, due to the decrease in filter attenuation.

To maximize output signal strength of the optical detectors 54, 58, 82 (FIG. 1), each detector should be designed such that it is optimized for the wavelength range of the sensor being detected.

Referring to FIG. 3, the wavelength separation between adjacent sensors on a given fiber should be sufficient such that no overlap occurs in the worst case conditions and, furthermore, that an additional guardband exists. We have found that for sensors working in the 1300 nanometer range and a single mode fiber made of silica with a germanium-doped core, the sensitivity is about 1 nanometer change in wavelength for 1000 microstrains change in strain. Furthermore, we have found that the maximum strain in one direction (i.e., either tensile strain or compressive strain) that can be applied without damaging the sensor would be approximately 10,000 microstrains. Thus, the maximum $\Delta n$ that can occur for a single sensor is about 10 nanometers in one direction or $\pm 10$ nanometers around a central unstrained wavelength of the sensor for both tensile and compressive strains. For a typical conservative application, half this range may be used.

In particular, if the sensor 24 experiences a maximum change in wavelength $\Delta \lambda_a$ and the adjacent sensor 28 experiences a maximum change in wavelength $\Delta \lambda_b$ in the other direction, there should be a further space or guardband $\Delta \lambda_{gb}$ to ensure no overlap occurs. For example, for a wavelength spacing $\Delta \lambda_c$ between the central unstrained wavelengths of adjacent sensors equal to about 15 nanometers, and a maximum wavelength change for a given sensor of $\pm 5$ nanometers, an acceptable $\Delta \lambda_{gb}$ would be about 5 nanometers. The size of $\Delta \lambda_{gb}$ depends on the application and sensing system design, but typically a few nanometers is acceptable.

Because output signals from the optical detectors are very low level, they are susceptible to electronic noise. Also, because the change in wavelength is quite small, the associated change in power is also small. Therefore, the associated change in voltage at the output of each optical detector is also small, thereby making the signals very susceptible to electronic noise. As a result, the signal-to-noise ratio is decreased. Thus, care must be taken to minimize noise in the circuitry in order to minimize the noise equivalent strain detection limit.

The modulation of the optical source is used to reduce the effects of electronic noise in the receiving portion of the system, i.e., the optical detectors 54, 68, 82 and demodulators 58, 72, 86 and also to allow demultiplexing of a plurality of strings (as discussed hereinafter). Thus, source modulation for the single sensor string embodiment of FIG. 1 is not required but is recommended to reduce the effects of noise. The source modulation is also used to reduce the effects of background optical noise.

Also, to help reduce the level of background optical noise, background light should be kept from entering the open air optics portion of the system between the collimator 46 and the detectors 54, 68, 82 (FIG. 1). As is known, one way to preclude outside light from entering the system is to shield the collimated light beams from the effects of external light.

Figure 4:
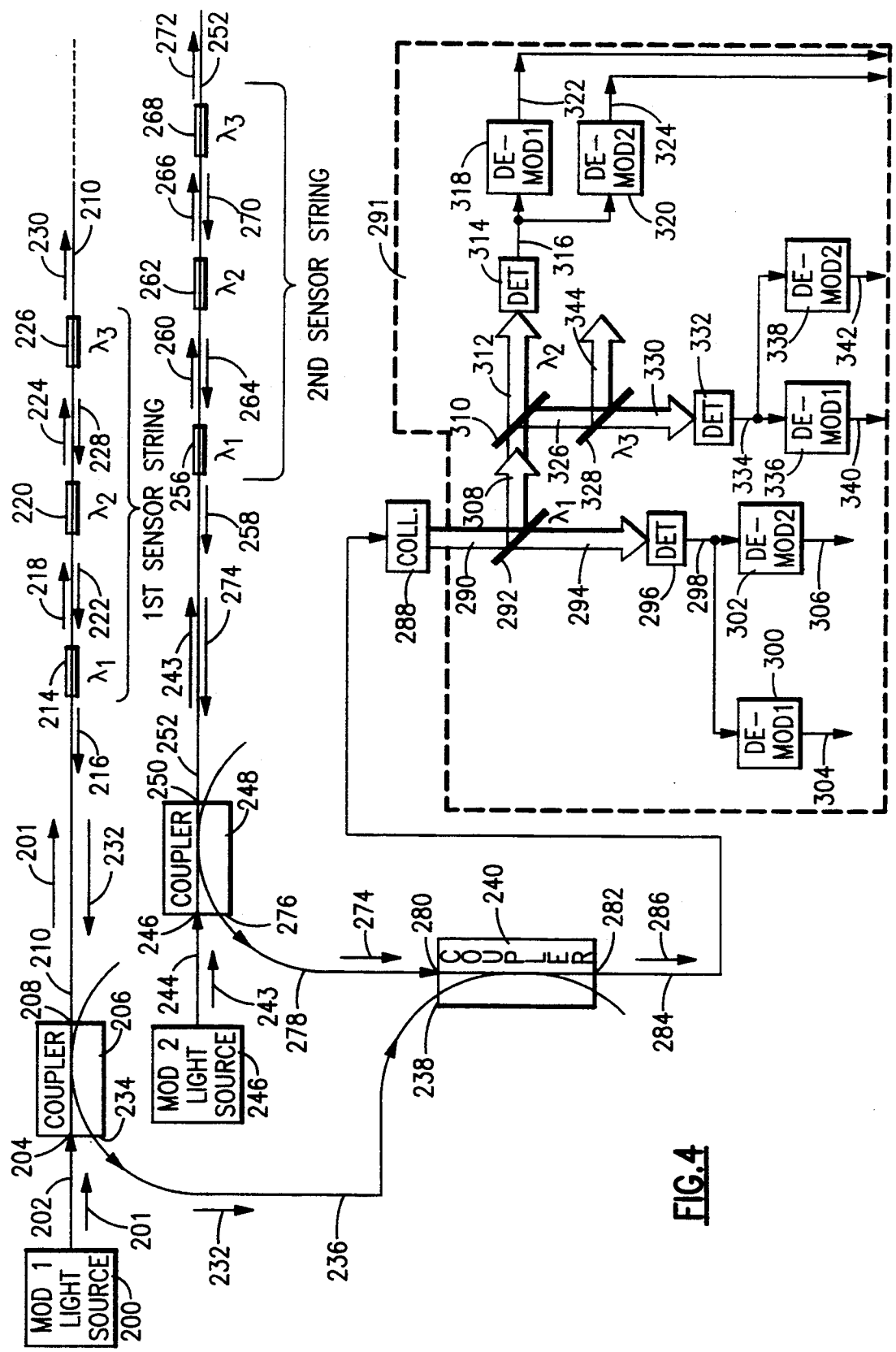
FIG. 4 is a schematic block diagram of the measurement system for a plurality of strings of sensors which are wavelength filtered and frequency demodulated in accordance with the present invention.

Referring now to FIG. 4, a plurality of sensor strings on optical fibers are coupled together, each string being essentially the same as that shown in FIG. 1. In particular, a modulated light source 200 similar to the light source 10, e.g., a photodiode and a modulation circuit, provides a sinusoidally modulated broadband light signal 201 modulated at a predetermined frequency, e.g., 5 kHz, which propagates along an optical fiber 202 to a first port 204 of an optical 2×2 coupler 206 and exits from a port 208 of the coupler 206 and propagates along an optical fiber 210.

The broadband light 201 is incident upon a fiber Bragg grating sensor 214 which reflects a narrow wavelength-band of light 216 having a central wavelength $\lambda_1$ and passes (or transmits) the remaining wavelengths as indicated by a line 218. The light 218 travels along the fiber 210 and is incident on a Bragg grating sensor 220 which reflects a narrow wavelength-band of light 222 having a central wavelength $\lambda_2$ and passes the remaining wavelengths of light 224.

The light 224 travels along the fiber 210 to a filter 226 which reflects a narrow wavelength-band of light 228 having a central wavelength $\lambda_3$ and passes the remaining wavelengths down the fiber 210. In effect, the Bragg grating sensors 214, 220, 226 comprise a first sensor string along the fiber 210.

The reflected wavelengths of light 216, 222, 228, having central wavelengths $\lambda_1$, $\lambda_2$, $\lambda_3$ propagate along the fiber 210 toward the coupler 206 and are indicated collectively by a line 232. The light 232 reenters the coupler 206 at the port 208 and exits the coupler 206 from a port 234 along a fiber 236 to a port 238 of a coupler 240.

A second set of sensors, coupler, and modulated light source are provided similar to the first set described above. In particular, a modulation light source 242 provides a modulated broadband light signal 243, similar to that provided by the modulation light source 200, but is modulated at a different frequency, e.g., 10 kHz. The light signal 243 is launched onto a fiber 244 which is connected to a port 246 of a 2×2 coupler 248. The modulated light signal 243 exits the coupler 248 from a port 250 along a fiber 252.

The light 243 is incident on a Bragg grating filter 256 which reflects a narrow wavelength-band of light 258 having a central wavelength $\lambda_1$ back toward the coupler 248. The remaining wavelengths of light pass through the grating sensor 256 as indicated by a line 260. The light 260 travels along the fiber 252 to a Bragg sensor 262 which reflects a narrow wavelength-band of light 264 having a central wavelength $\lambda_2$ associated with the sensor 262 and passes the remaining wavelengths of light as indicated by a line 266.

The light 266 travels along the fiber 252 to a Bragg grating sensor 268 which reflects a narrow wavelength-band of light 270 having a central wavelength $\lambda_3$ associated with the sensor 268 and passes the remaining wavelengths of light, as indicated by a line 272. The reflected light 258, 264, 270 having central wavelengths propagate back toward the coupler, as indicated collectively by a line 274. The light 274 reenters the coupler 248 at the port 250 and exits the coupler 248 from a port 276 on a fiber 278 which is connected to a port 280 on the coupler 240. In effect, the Bragg grating sensors 256, 262, 268 comprise a second sensor string along the fiber 252.

The light 232 from the first sensor string is combined with the light 274 from the second sensor string in the coupler 240. The combined light signal 286 exits from the coupler 240 at a port 282 on a fiber 284. It should be understood that because the source light is modulated, the light reflected from the sensor is also modulated at the same frequency. Thus, the reflected light 232 from the first sensor string is modulated at the frequency associated with the modulation source 200 and the reflected light 274 from the second sensor string is modulated at the frequency of the modulation source 242.

The light in the fiber 284 is passed to a collimator 288 (similar to that discussed in FIG. 1) which converts the light 286 in the fiber 284 into a collimated beam 290.

The collimated beam 290 is incident upon an optical-to-electronic demultiplexer 291, similar but not identical to the demultiplexer 49 of FIG. 1, which continuously wavelength filters and frequency demodulates the optical input signal to provide a plurality of electrical continuous output signals each having a magnitude indicative of the wavelength of a corresponding one of the sensors 214, 220, 226, 256, 262, 268. In particular, the collimated beam 290 is incident upon an optical bandpass filter 292, similar to the filters 50, 64, 78 of FIG. 1, having a narrow wavelength-band which overlaps with a wavelength $\lambda_1$ associated with the unstrained sensors 214, 256.

The optical filter 292 passes light 294 having a power indicative of the input power of the light 290 at the wavelengths of the reflected light 216, 274 from the sensors 214, 256, reduced by the attenuation of the filter 292 at those wavelengths. As discussed with FIG. 1, the intersection between the reflectivity profile of the sensors and the filter profile (which determines the amount of filter attenuation) is designed to be in the linear region of the passband profile of the associated filter. The light 294 is incident upon a detector 296 which provides an electrical signal on a line 298 indicative of the power of the input signal 294 incident thereon.

The electrical signal on the line 298 is fed to two demodulators 300, 302. The demodulator 300 is e.g., an asynchronous demodulator operating at the modulation frequency of the modulation light source 200, i.e., 5 kHz. Note that any of the demodulators discussed herein may instead be synchronous demodulators if desired (just as discussed with FIG. 1). The demodulator 302 is an asynchronous demodulator running at the modulation frequency associated with the light source 242, i.e., 10 kHz. Thus, the demodulator 300 provides an output signal on a line 304 indicative of the wavelength variations associated with the sensor 214.

Similarly, the demodulator 302 provides an output signal on a line 306 indicative of the wavelength variations of the sensor 256. It should be understood that, because the sensors 214, 220, 226 associated with the first sensor string are modulated at a different frequency than the sensors 256, 262, 268 of the second sensor string, the signals may be independently demodulated without having cross-talk between the sensors that have similar wavelengths.

The filter 292 reflects a light beam 308 to a filter 310, similar to that of the filter 292, which has a passband frequency range overlapping that of the grating sensors 220, 262. The filter 310 passes light 312 having a power related to the intersection between the reflectivity of the sensors 220, 262 and the linear region of the passband profile of the filter 310 (as discussed hereinbefore). The light 312 is incident upon a detector 314 which provides an electrical signal on a line 316 indicative of the power of the incident light 312. The electrical signal on the line 316 is fed to electrical demodulators 318, 320. The demodulator 318 runs at the same frequency as the modulation light source 200 and therefore provides an output signal on a line 322 indicative of the light 222 reflected from the sensor 220. Thus, the signal on the line 322 is an output voltage which varies with the strain on the sensor 220. Similarly, the demodulator 320 provides an output signal on a line 324 indicative of the wavelength variation of the sensor 262, thereby providing an output voltage which varies with the strain on the sensor 262.

The filter 310 reflects a light beam 326 to a filter 328 having a narrow wavelength-band profile similar to that of the filters 292, 310, but at a different wavelength, and overlapping with the reflectivity profile of the sensors 226, 268. The filter 328 passes a light beam 330 having a power related to the intersection between the wavelengths reflected by the sensors 226, 268 and the linear region of the passband profile of the filter 328 (as discussed hereinbefore) to a detector 332 which provides an electrical signal on a line 334 to two demodulators 336, 338. The demodulator 336 runs at the same frequency as the modulated light source 200 similar to that of the demodulators 300, 318 and provides an output signal on a line 340 indicative of the reflectivity wavelength variation of the Bragg grating sensor 226, thereby providing an output voltage which varies with the strain seen by the sensor 226. The demodulator 338 runs at the same frequency as the demodulated light source 242 and provides an electrical output signal on a line 342 indicative of the reflectivity wavelength variation of, and thus the strain seen by, the grating sensor 268 on the second sensor string.

The filter 328 reflects light not passed by the filters 292, 310, 328, is indicated as the light beam 344, and is not used.

While the sensors 214, 256 have been indicated as having the same central reflectivity wavelength $\lambda_1$, it should be understood that this is actually a common reflectivity wavelength range. In particular, the wavelength of the reflected light from each sensor will likely be different due to different strains being sensed. However, the sensors 214, 256 and the corresponding optical filter 292 are designed such that the reflected wavelengths of the sensors will intersect the same filter profile in the linear region over the operating range of both sensors 214, 256. This allows for a plurality of identical sensor strings, each string having a predetermined set of unstrained sensor reflectivity wavelengths, to be used.

To minimize the number of filters and maximize the use of the demodulators, every sensor in a given string has a common reflectivity range with a sensor in every other string. At minimum, at least one sensor on a given string should have a common wavelength range with a sensor of another string. In general, the number of filters required is determined by the number of sensors having unique reflectivity wavelength ranges.

Also, it should be understood that more sensor strings may be used if desired. In that case, a third modulated light source modulated at a third modulation frequency, an associated coupler, and an associated sensor string would be coupled into the collimator 288 and a third demodulator would be added to the outputs of the detectors 296, 314, 332 running at the frequency of the third modulated light source. Also, an additional coupler between the coupler 240 and the collimator 288 would be needed to combine the third string reflected signal into the other two strings.

However, it should be understood that each coupler causes some signal degradation to occur. Thus, there is a limited number of couplers that may be connected while still maintaining adequate signal levels.

Also, more sensors may be used on a single string. In that case, an additional detector and set of demodulators would be needed for each additional sensor. The number of demodulators will depend on the number of strings that have the additional sensor.

Figure 5:
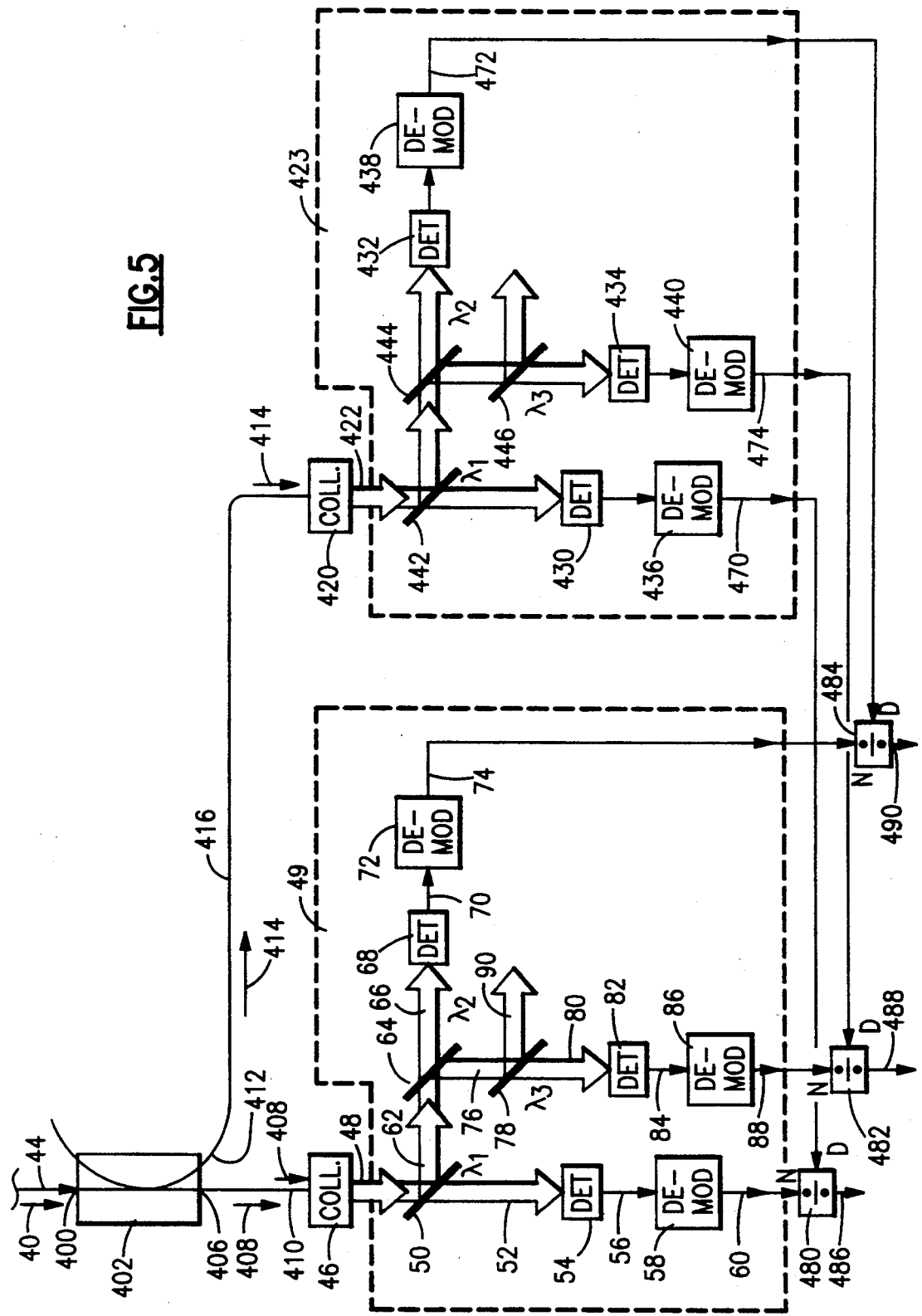
FIG. 5 is a schematic block diagram of an addition to the embodiment of FIG. 1 for measurement and normalization of the power level of the reflected light in accordance with the present invention.

Referring now to FIG. 5, because the invention derives its output voltage based on the power of the reflected light at a given set of wavelengths, if the source or reflected optical power increases or decreases due to an effect other than a wavelength shift, this change in power may falsely appear as a perturbation change on the output signal. To avoid this potential source of inaccuracy, a reference power signal is provided that normalizes the output voltage signal such that increases or decreases in power not due to wavelength shifts do not affect the output signal.

To provide this feature, additional components may be added to the embodiment of FIG. 1, as shown in FIG. 5. The light 40 travelling along the fiber 44 from the coupler 16 (FIG. 1) enters a port 400 of a coupler 402 where it is split into approximately two halves. The first half of the optical signal 40 exits the coupler 402 at a port 406 as an optical signal 408 along a fiber 410. The second half of the optical signal 40 exits the coupler 402 at a port 412 as an optical signal 414 along a fiber 416.

The optical signal 408 enters the collimator 46, as described hereinbefore regarding FIG. 1, and is processed by the optical-to-electrical demultiplexer 49 in the same manner as described hereinbefore for FIG. 1 to provide wavelength filtered and frequency demodulated output signals on the lines 60, 74, 88 corresponding to the sensors 24, 28, 34.

The optical signal 414 on the fiber 416 from the coupler 402 is fed to a collimator 420, similar to the collimator 46 of FIG. 1. The output of the collimator 420 is a collimated light 422 which is fed to an optical filter 424 similar to the filter 50 of FIG. 1.

The light 414 in the fiber 416 is passed to a collimator 420 (similar to that discussed in FIG. 1) which converts the light 414 in the fiber 416 into a collimated beam 424. The collimated beam 424 is incident upon an optical-to-electronic demultiplexer 423, similar but not identical to the demultiplexer 49 of FIG. 1, which continuously wavelength filters and frequency demodulates the optical input signal to provide a plurality of continuous electrical output signals each having a magnitude indicative of the power of light at the wavelength of a corresponding one of the sensors 24, 28, 34 (FIG. 1).

In particular, detectors 430, 432, 434 are substantially the same as and provide the same function as, the detectors 54, 68, 82 of FIG. 1, and demodulators 436, 438, 440 are substantially the same as and provide the same function as, the demodulators 58, 72, 86 of FIG. 1. The only significant difference between the demultiplexer 423 and the demultiplexer 49 (of FIG. 1) is the shape of the bandpass of optical filters 442, 444, 446.

Figure 6:
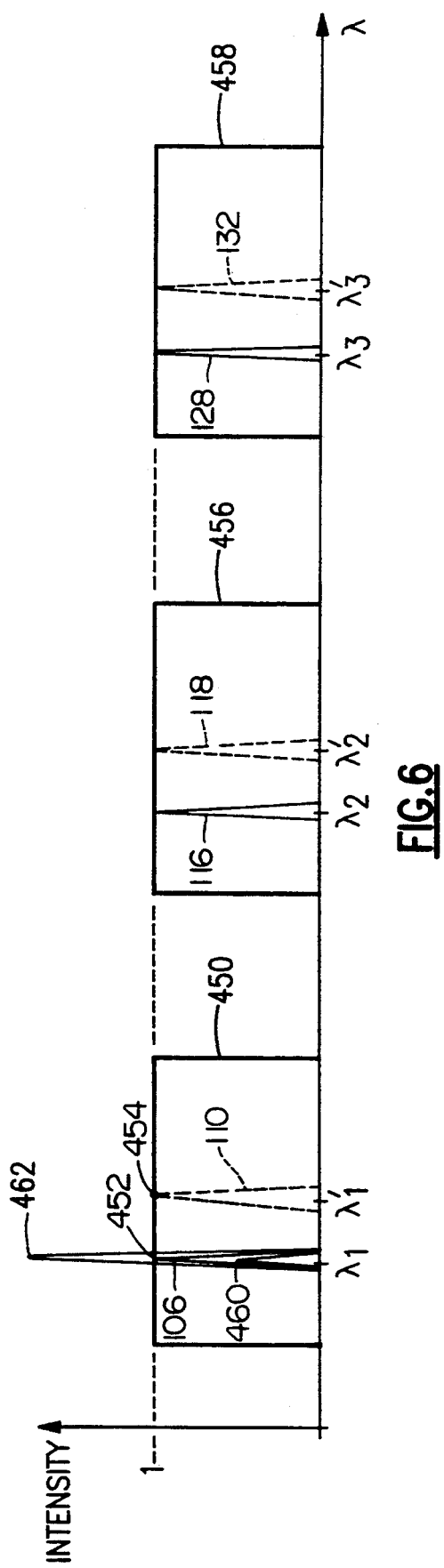
FIG. 6 is a graph showing the reflectivity profile of three Bragg grating sensors superimposed on the wavelength response of a rectangular window optical band pass filter in accordance with the present invention.

Referring to FIG. 6, the optical filter 442 has a bandpass profile 450 having an idealized unity-gain rectangular window which passes all wavelengths within the window at the same power as the input signal. Other gains may be used if desired. If the wavelength $\lambda_1$ associated with the reflectivity profile 106 (FIG. 2) of the sensor 24 shifts to a different wavelength $\lambda_1'$, the intersection of the reflectivity profile 106 with the filter profile 450 changes from a point 452 to a point 454, respectively. However, because the filter response is flat, there is essentially no change in the output power. Similar bandpass profiles 456, 458 exist for the filters 444, 446. Thus, wavelength shifts produce no change in output power from the filters 442, 444, 446.

However, if the power of light at a given wavelength changes, e.g., from the point 452 to a point 460 or to a point 462, the output power of the filter changes proportionally. Thus, the filters 442, 444, 446 provide an output signal proportional to the power of the light in a given wavelength range near a given sensor but independent of the specific wavelength within the filter window.

Accordingly, the demultiplexer 423 provides continuous electrical output signals on lines 470, 472, 474 corresponding to the power of the light at the wavelengths corresponding the sensors 24, 28, 34, respectively, thereby providing power reference signals.

The optical power reference signals on the lines 470, 472, 474 are each fed to the denominator input of corresponding divider circuits 480, 482, 484. Also, the electrical signals on the lines 60, 72, 88 from the demultiplexer 49 are each fed to the divider circuits 480, 482, 484 corresponding to the same sensors as do the lines 470, 472, 474.

The divider circuits 480, 482, 484 provide output signals on the lines 486, 488, 490 corresponding to the sensors 24, 28, 34 having a voltage indicative of the power-normalized strain response of the respective sensor that does not fluctuate due to power variations in the source or reflected light beams.

For example, if the power of the signal 408 at a wavelength corresponding to the sensor 24 increases for any reason, the output signal on the line 60 will increase correspondingly because the power of the input signal to the filter 50 increased and, thus, the output signal from the filter 50 increased. However, a corresponding increase occurs on the signal on the line 470. Thus, the division at the divider 480 cancels out the two effects and the output signal on the line 486 remains constant even though the input power increased. This normalization will occur even if the power increase is coupled with a wavelength shift because the signal on the line 470 will not change due to a wavelength shift. Thus, the output signal on the line 486 changes with the signal on the line 60 if that change is due to a wavelength shift but not if it is due to an power change.

It should be understood that a similar addition may be made to the embodiment of FIG. 4 to normalize the output signals on the lines 304, 306, 322, 324, 340, 342, for fluctuations in source or reflected optical power level not related to wavelength shifts.

The passband of the optical filter in FIG. 2 is shown as having such a shape for illustrative purposes, and it should be understood that the filter may actually be symmetric about the peak wavelength and that it may likely have a Gaussian, exponential, or other non-linear shape. Also, although the bandpass optical filter intersects with the reflectivity profile of the sensors in a linear region of the filter, it should be understood that a non-linear region of the filter may also be used. The linear region merely provides a linear output signal relationship with strain, which simplifies the conversion process. For a Gaussian distribution shape, there is a region which is linear in a first order approximation, such that small changes in strain produce a linear output response, and large changes requires accounting for the non-linear nature of the curve. Thus, the filter response need only have a monotonic (i.e., a slope having a constant sign) region which overlaps the reflectivity profile of the sensor. Also, either the positive or negative slope of the optical filter may be used as the region that overlaps with the sensor reflectivity profile.

Also, even though the invention has been described as being used to detect strain, it should be understood that any perturbation or measurand may be measured provided it causes a change in the reflectivity profile, as discussed in aforementioned U.S. Pat. Nos. 4,806,012 and 4,761,073, both to Meltz et al. For example, the fiber may be coated with a material that causes expansion or contraction due to exposure to electric or magnetic fields or certain chemical compositions or other perturbations.

Even though the invention has been described as using Bragg gratings as the sensors that detect the perturbation, any reflective device having a narrow reflectivity wavelength that shifts with applied stress may be used if desired. Also, the sensors need not be impressed in the same type of fiber as the fiber that feeds the sensors, e.g., the sensors may be spliced into the fiber.

Also, it should be understood that instead of the sensors being individual reflectors (such as Bragg gratings), each sensor may comprise a pair of reflective gratings in a fiber laser configuration, similar to that described in commonly owned copending U.S. patent application Ser. No. 08/069,231, filed May 28, 1993, entitled "Active Multipoint Fiber Laser Sensor", by Ball et al.

Also, although the invention has been described as employing an optical fiber, any optical waveguide may be used if desired.

Also, it should be understood that the divider circuits 480, 482, 484 may also be done in software with the appropriate hardware interfaces, e.g., with A/D converters.

Although the invention has been described and illustrated with respect to the exemplary embodiments thereof, it should be understood by those skilled in the art that the foregoing and various other changes, omissions and additions may be made without departing from the spirit and scope of the invention.

We claim:

1. A measurement system for optical sensors, comprising:
   light source means for providing a continuous broadband light, said broadband light being launched into an optical waveguide;
   a sensor string comprising a plurality of sensors disposed in the path of said broadband light, each sensor providing a reflected light having a corresponding unique peak reflection wavelength associated with said broadband light;
   said reflection wavelength being related to the magnitude of a perturbation imposed upon a corresponding one of said sensors;

collimating means for collimating said reflected light from said sensors and for providing a collimated light;

a plurality of optical filters each corresponding to one of said sensors, each disposed in the path of a portion of said collimated light, each having a passband with a monotonic region overlapping said reflection wavelength of said corresponding one of said sensors, each of said filters providing passed light transmitted through said filter, said passed light having a power related to the optical transmission of the optical filter at the sensor reflection wavelength; and a plurality of optical detection means each disposed in the path of said passed light of a corresponding one of said optical filters, each for detecting the power of said passed light, and each for providing an electrical output signal indicative of the power of said passed light, the magnitude of said output signal being indicative of the magnitude of said perturbation on said corresponding one of said sensors.

2. The measurement system of claim 1, further comprising:

modulating means for modulating said broadband source light at a predetermined modulation frequency and for providing a continuous modulated source light for being launched into said optical waveguide; and demodulating means for demodulating said passed light at a frequency equal to said modulation frequency.

3. A measurement system of claim 2, further comprising a plurality of said modulators, a plurality of said sensor strings, each of said sensor strings having at least one sensor having a common reflection wavelength range with a sensor from another one of said strings, and a plurality of said demodulators, each of said demodulators being responsive to one of said detectors, running at the frequency of one of said modulators, and each of said demodulators being associated with a corresponding sensor string having a light source modulated at the frequency of one of said modulators, and the number of said filters being equal to the number of sensors having unique reflection wavelength ranges.

4. The measurement system of claim 3, wherein each of said sensors associated with each sensor string has a common reflection wavelength range with a sensor in every other sensor string.

5. The measurement system of claim 1, wherein at least one of said optical filters comprises a substantially linear region within said monotonic region.

6. The measurement system of claim 5, wherein said Bragg grating is embedded in said optical waveguide.

7. The measurement system of claim 1, wherein at least one of said sensors comprises a Bragg grating.

8. The measurement system of claim 1, wherein said perturbation is the strain on said sensor.

9. The measurement system of claim 1, further comprising power compensation means for monitoring the power level of said reflected light and for normalizing said electrical output signal such that power fluctuations not related to a shift in reflection wavelength do not produce a change in said output signal.

* * * * *